UNITED STATES PATENT OFFICE.

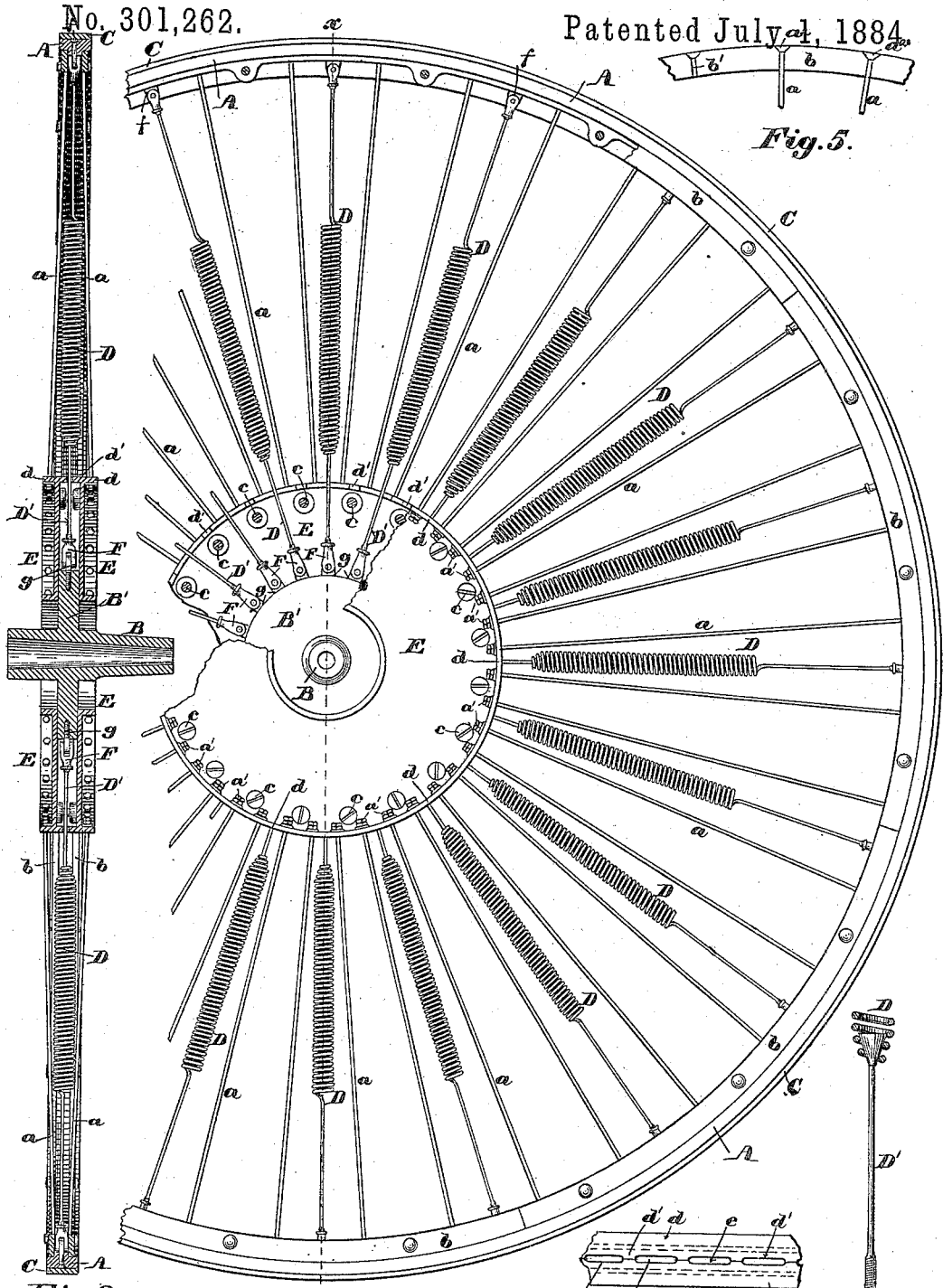

WILLIAM D. ORCUTT, OF BOSTON, MASSACHUSETTS.

CARRIAGE-WHEEL.

SPECIFICATION forming part of Letters Patent No. 301,262, dated July 1, 1884.

Application filed February 29, 1884. (No model.)

*To all whom it may concern:*

Be it known that I, WILLIAM D. ORCUTT, of Boston, in the county of Suffolk and State of Massachusetts, have invented certain new and useful Improvements in Carriage-Wheels, of which the following, taken in connection with the accompanying drawings, is a specification.

My invention relates to the construction of wheels for light carriages; and it consists in certain novel features of construction and combinations and arrangements of parts, which will be best understood by reference to the description of the drawings, and to the claims to be hereinafter given.

Figure 1 of the drawings is a partial side elevation of a wheel embodying my invention. Fig. 2 is a section on line $x\ x$ on Fig. 1. Figs. 3, 4, and 5 are details to be hereinafter referred to.

A is the rim or felly, made, preferably, of metal; B, the hub, also of metal; and C, the tire. The hub B is connected to the rim A by a series of springs, D D, which serve to support the load and render the wheel yielding or elastic, and at the same time permit the hub to be moved to a position eccentric to the rim by the power exerted in drawing the load. The rim A is stayed against the tendency to collapse by two series of light spokes, $a\ a$, connected at their outer ends to the rim A by means of the rings $b\ b$, and at their inner ends to the annular plates E E, which plates are firmly secured together by the stay-bolts $c\ c$, as shown. The plates E E are each provided with outwardly-projecting ribs $d$, through which the spokes $a\ a$ pass, and in which they are secured by the nuts $a'\ a'$, as shown in Fig. 1, and also with an inwardly-projecting annular rib, $d'$, having notches or recesses formed in its edge, which ribs, when said annular plates are placed together in proper position, serve to hold them at the desired distance apart, and said notches form the slots $e\ e$, (shown in Figs. 1, 2, and 3,) through which the rods D' of the springs D pass to reach the flange B' of the hub B, as shown in Figs. 1 and 2. The rim A has secured therein a series of eyebolts, $f\ f$, which may be riveted therein, as shown, or screwed therein in the same manner that the eyebolts $g\ g$ are secured to the flange B' of the hub B, as shown in Fig. 2. The springs D D are pivoted at their outer ends to the eyebolts $f\ f$, and have the inner ends of their coils made cone-shaped, to receive the conical heads of the rods D', as shown in Fig. 4. Each of the rods D' has formed upon its inner end a male screw-thread, to receive the forked coupling F, which embraces and is pivoted to the eyebolt $g$, as shown in Figs. 1 and 2. The outer end of each of the spokes $a\ a$ has formed thereon a conical or tapering head, $a^2$, and the inner faces of the rings $b\ b$ have formed therein a series of radial grooves, $b'$, the outer ends of which are made flaring, to receive said headed ends of the spokes $a\ a$, as shown in Fig. 5. The flange B' of the hub B fits between the annular plates E E, in contact with which it moves as the wheel rotates, when a load is supported upon the hub, which load causes the springs above the hub to be expanded, and those below the hub to contract or become slack by the hub B assuming a position eccentric to the axis of the rim. The hub B will also be moved horizontally when power is applied to move the load, so that its center is in advance of the center of the rim, and the springs in the rear of the hub will be strained or expanded, and those in front of it will be contracted or become slack, when the weight or gravity of the load, acting through the expanded springs, will assist in propelling the load along the ground. By this construction an advantage is obtained in the ease with which the load can be drawn, and also in the yielding or elastic nature of the wheel, which obviates the necessity of placing springs beneath the carriage-body.

What I claim as new, and desire to secure by Letters Patent of the United States, is—

1. The combination, in a carriage-wheel, of the rim A, the hub B, provided with the flange B', the series of radially-arranged springs D D, the two series of spokes $a\ a$, and the two annular plates E E, secured together by the bolts $c\ c$, all arranged and adapted to operate substantially as described.

2. The combination, in a wheel, of the rim A, the two rings $b\ b$, each provided upon its inner face with a series of radial grooves, $b'$, enlarged at their outer ends, the two series of spokes $a$, provided at their outer ends with the heads $a^2$, and at their inner ends with male screw-threads and the nuts $a'$, and the annular plates E E, provided with the annular ribs $d$, all arranged and adapted to operate substantially as described.

In testimony whereof I have signed my name to this specification, in the presence of two subscribing witnesses, on this 27th day of February, A. D. 1884.

WM. D. ORCUTT.

Witnesses:
N. C. LOMBARD,
WALTER E. LOMBARD.